US012729642B2

(12) United States Patent
Reed

(10) Patent No.: US 12,729,642 B2

(45) Date of Patent: Sep. 8, 2026

(54) PISTON SYSTEM FOR A COMPRESSION ENGINE

(71) Applicant: Jesse Reed, Redford, NY (US)

(72) Inventor: Jesse Reed, Redford, NY (US)

( * ) Notice: Subject to any disclaimer, the term of this patent is extended or adjusted under 35 U.S.C. 154(b) by 0 days.

(21) Appl. No.: 19/277,054

(22) Filed: Jul. 22, 2025

(65) Prior Publication Data

US 2026/0009350 A1 Jan. 8, 2026

Related U.S. Application Data

(63) Continuation-in-part of application No. 18/918,554, filed on Oct. 17, 2024, now Pat. No. 12,372,026.

(60) Provisional application No. 63/592,265, filed on Oct. 23, 2023.

(51) Int. Cl.

*F02B 75/04* (2006.01)

*F02F 3/00* (2006.01)

(52) U.S. Cl.

CPC ............ *F02B 75/04* (2013.01); *F02F 3/0015* (2013.01)

(58) Field of Classification Search

CPC .......... F02B 75/04; F02B 75/24; F02B 75/32; F02B 75/28; F02F 3/0015; F16C 3/20; F16C 3/26; F16C 7/02; F16H 21/18

See application file for complete search history.

(56) References Cited

U.S. PATENT DOCUMENTS 4,887,560 A * 12/1989 Heniges .................. F02B 41/04 123/78 F
5,215,051 A * 6/1993 Smith ................... F02B 75/047 74/44
5,406,911 A * 4/1995 Hefley .................. F02B 75/045 123/48 B
5,816,201 A * 10/1998 Garvin .................. F02F 7/0019 123/53.1
5,927,236 A * 7/1999 Gonzalez ............. F02B 75/048 123/78 F
6,453,869 B1 * 9/2002 Moore .................. F02B 75/048 123/197.4
6,543,225 B2 * 4/2003 Scuderi ................. F02B 75/228 123/53.1
10,234,006 B2 * 3/2019 De Gooijer ........... F16H 37/124
11,371,496 B2 * 6/2022 Shen ..................... F02B 75/045
2020/0063655 A1 * 2/2020 Gutzer .................... F02D 15/02
2020/0291778 A1 * 9/2020 MacDonald ............ F16H 21/36

FOREIGN PATENT DOCUMENTS

WO WO-2013048262 A1 * 4/2013 ................ F01B 9/02

* cited by examiner

*Primary Examiner* — Grant Moubry

(74) *Attorney, Agent, or Firm* — Downs Rachlin Martin PLLC

(57) ABSTRACT

A piston system for a compression engine that detonates fuel during an appropriate part of the cycle includes a piston and a connecting rod that connects the piston to a crankshaft via a cam on crankshaft. The cam on the crankshaft provides an offset such that the orbit of the cam during each stroke cycle is different than the orbit of the crankshaft. The connecting rod is connected to the cam such that the orbit of the cam is larger than the orbit of the cam. In this way, for each stroke cycle, the crankshaft is always past the top of its orbit when the piston is at top dead center.

4 Claims, 12 Drawing Sheets

PISTON SYSTEM FOR A COMPRESSION ENGINE

RELATED APPLICATION DATA

This application is a continuation-in-part of U.S. patent application Ser. No. 18/918,554, filed Oct. 17, 2024 and titled "Piston System For A Compression Engine," which claims the benefit of priority of U.S. Provisional Patent Application Ser. No. 63/592,265, filed Oct. 23, 2023, and titled "Piston System For A Compression Engine," each of which is incorporated by reference herein in its entirety.

FIELD OF THE DISCLOSURE

The present invention generally relates to the field of compression engines. In particular, the present invention is directed to a piston system for a compression engine.

BACKGROUND

There are generally four primary modes of operation for reciprocating internal combustion engines: spark ignition, homogeneous charge compression ignition, compression ignition, and dual fuel compression ignition. Compression engines usually operate at higher compression ratios (12-24) than spark ignition engines. In compression engines, varying the amount of fuel injected into the cylinder controls the load. Instead of ignition by a spark plug, the air-fuel mixture self-ignites due to heat and pressure caused by compression. The rate of the combustion process is generally limited by factors such as droplet formation, collisions, break-up, evaporation and vapor diffusion. An advantage of compression engines over spark ignition engines are low pumping losses, due to a lack of a throttle, and a higher compression ratio, which allows for higher efficiency.

In many compression engines, only air is compressed during the majority of the compression process and so high compression pressures can be achieved. Toward the end of this wcompression process, fuel is injected under high pressure into the combustion chamber. The fuel is not instantaneously ignited upon injection into the combustion chamber, but there is an ignition delay period, which depends on numerous factors including engine speed, compression pressure and temperature, and the quantity of diesel fuel injected. Ignition delay decreases with increasing compression pressure and temperature, among other factors.

SUMMARY OF THE DISCLOSURE

A piston system for a compression engine includes a piston, a connecting rod connecting the piston to a crankshaft of the engine, and a cam on the crankshaft providing an offset such that an orbit of the cam during a stroke cycle is different than an orbit of the crankshaft during the stroke cycle, wherein the connecting rod is connected to the cam such that the orbit of the cam is larger than the orbit of the cam and configured so that the crankshaft is past the top of its orbit when the piston reaches top dead center during each stroke cycle.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

A piston system for a compression engine that detonates fuel during an appropriate part of the cycle is disclosed. A piston system for a compression engine includes a main piston and an inner piston that is within the main piston, and the head of the inner piston is preferably substantially smaller than the head of the main piston. In operation, the inner piston's path through the cylinder is offset by a predetermined amount with respect to the main piston's path through the cylinder such that at the point when the main piston is just past the zenith, the head of the inner piston becomes flush with the head of the main piston. This motion of the inner piston ensures that fuel will detonate when the main piston is just path the zenith, avoiding damage from untimely detonations. The ratio of the area of the main piston to the inner piston determines the timing of the detonation.

In an embodiment, this is achieved via an offset journal of the connecting rod of the inner piston compared to the connecting rods of the outer piston. The connecting rod of the inner piston is connected to the crank such that the inner piston's path through the cylinder is offset with respect to the main piston's path through the cylinder such that during the upward stroke, the main piston will be higher than the inner piston until the main piston reaches the zenith or top center of its motion. At this point, the inner piston head becomes flush with the main piston head, causing detonation and thereby ensuring the detonation occurs only when the main cylinder is at or just past top center of its motion. An offset round cam surface results in the difference in travel paths of the inner piston in relation to the main piston. The connecting rods for the present invention can be machined separately and then assembled.

Figure 1A:
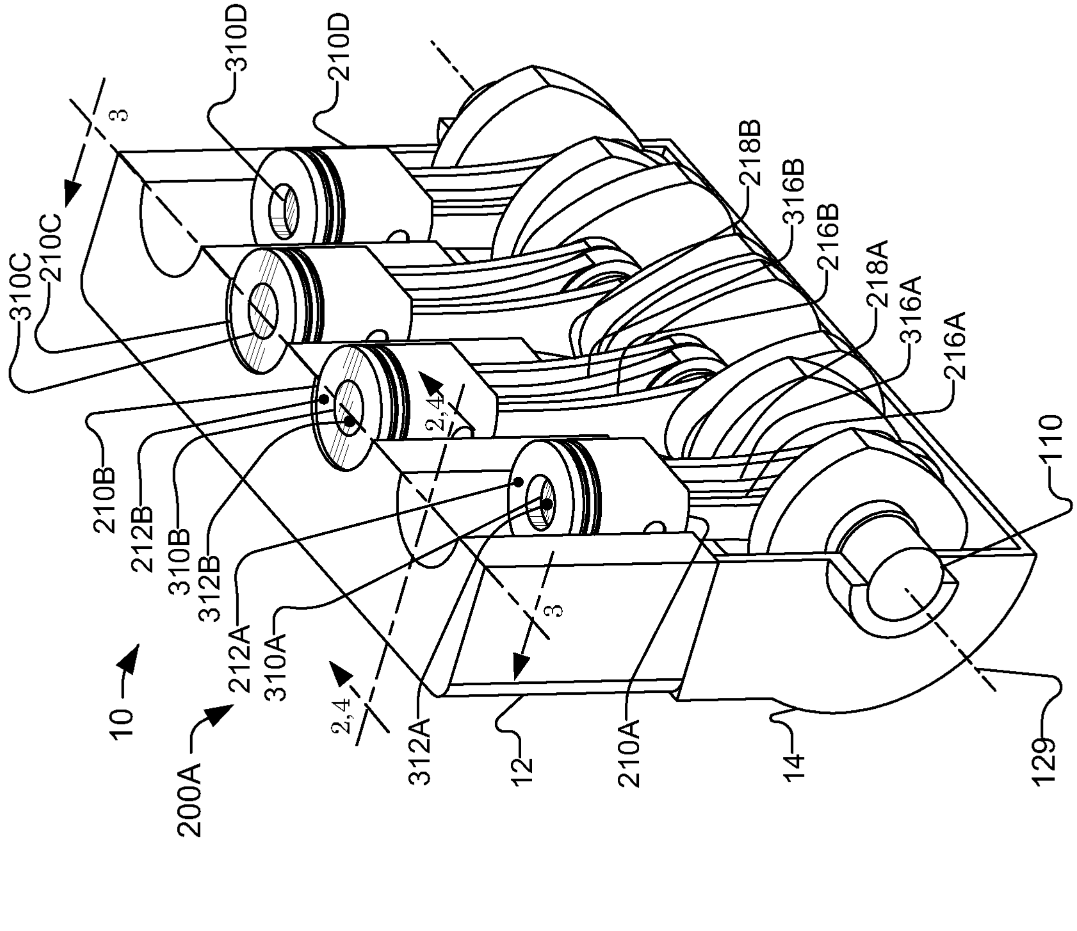
FIG. 1A is a partial perspective view of a portion of an illustrative compression engine.
Figure 1B:
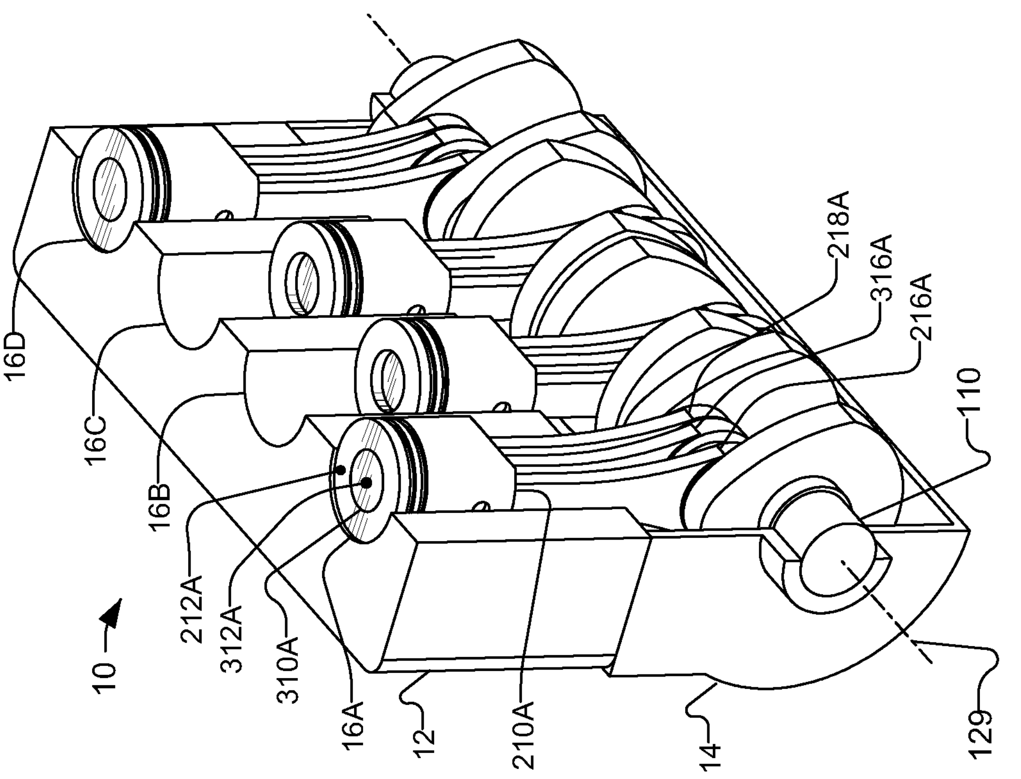
FIG. 1B is a partial perspective view of a portion of the compression engine of FIG. 1A.
Figures 2A, 2B, 2C:
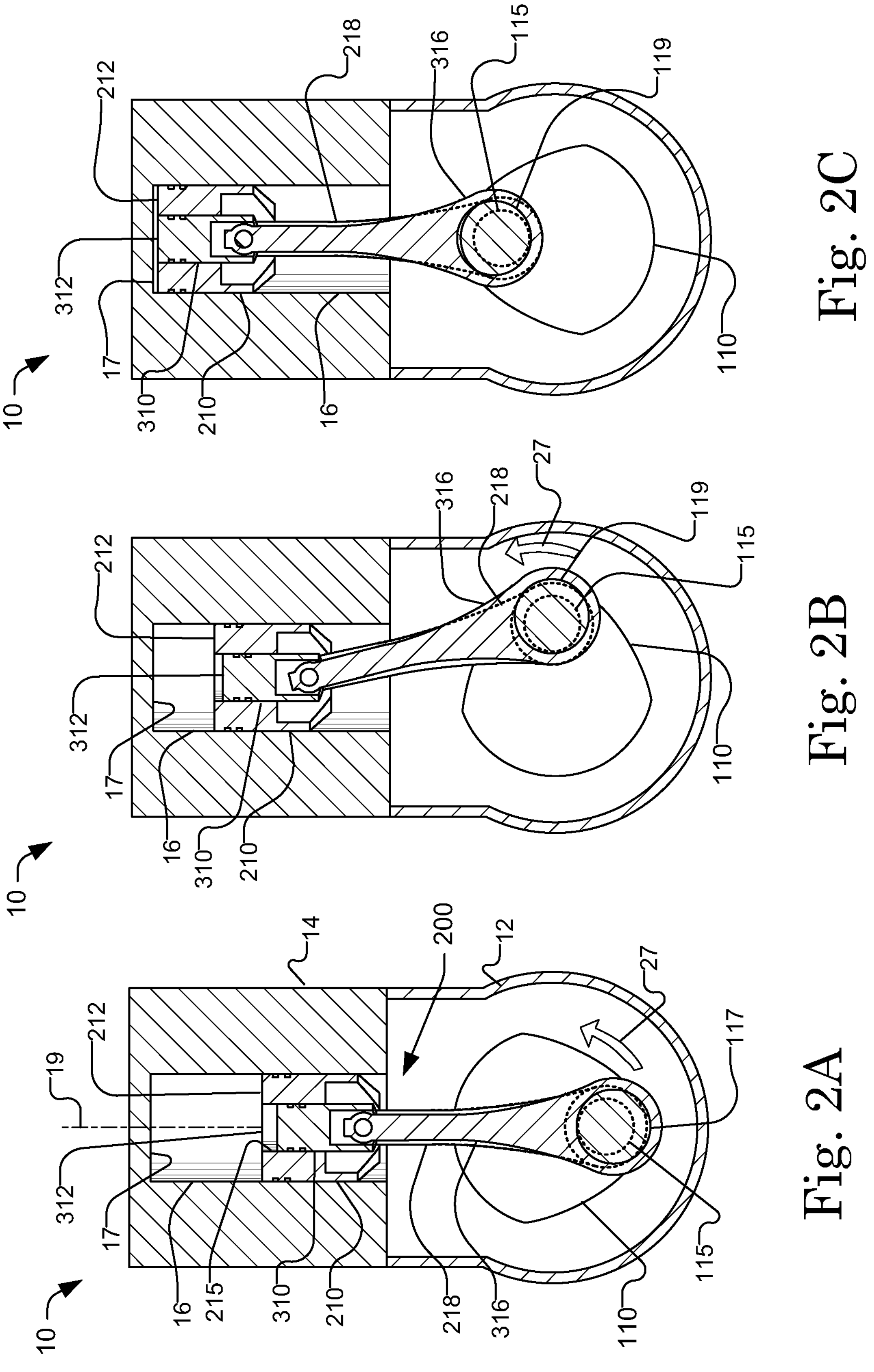
FIGS. 2A-2C are section views of the compression engine of FIG. 1A through line 2.4.
Figure 3C:
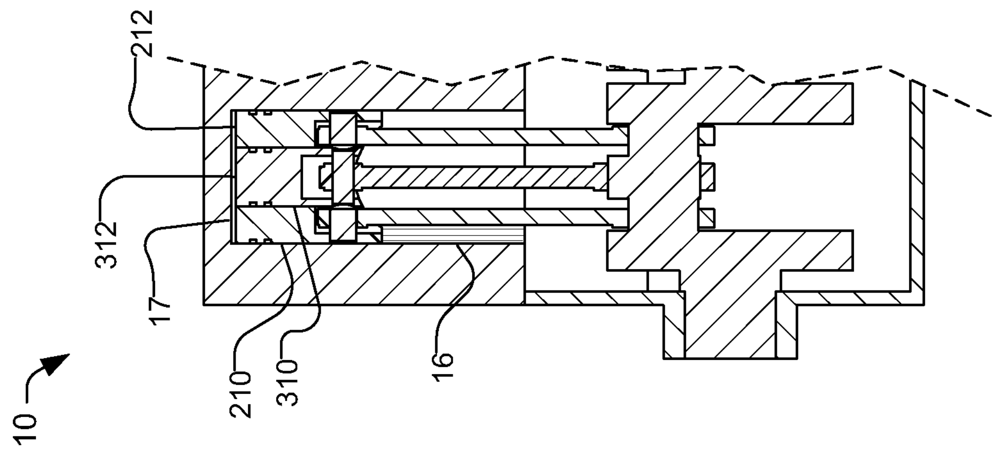
FIGS. 3A-3C are section views of the compression engine of FIG. 1*a* through section line 3 showing the piston assembly in the same positions as depicted in FIGS. 2A-2C.
Figure 3B:
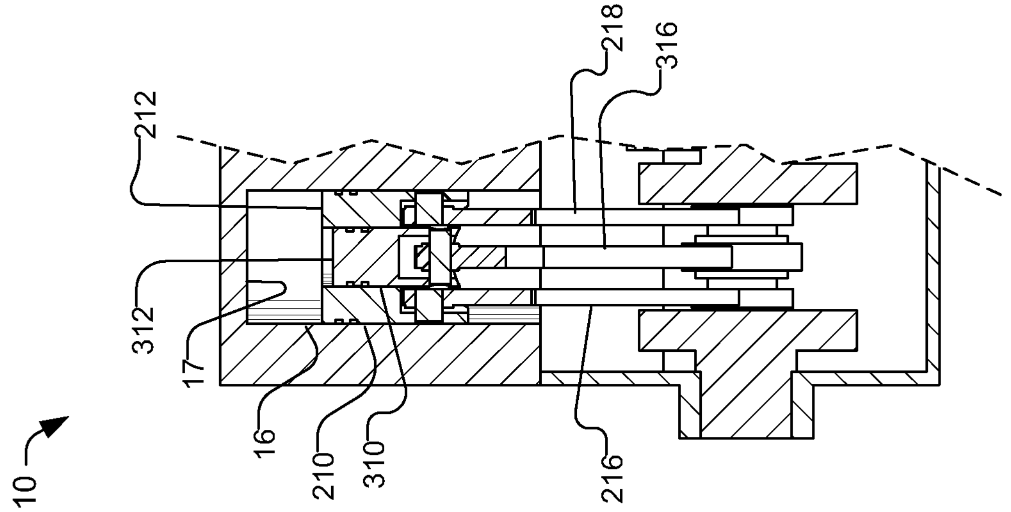
Figure 3A:
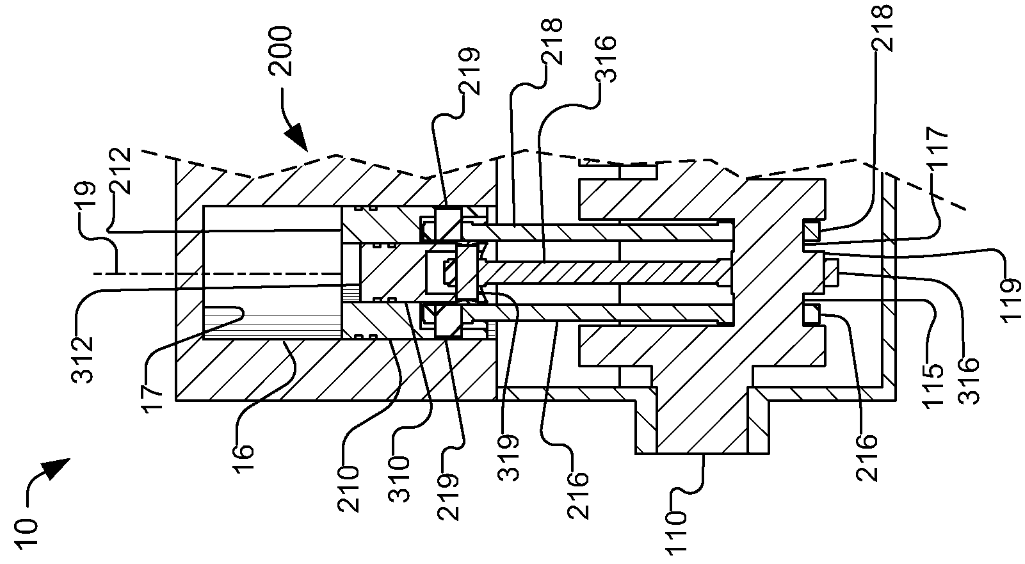

Turning to the figures, FIGS. 1A and 1B each show a partial perspective view of a simplified compression engine 10. The compression engine 10 includes four piston assemblies 200 according to the technology disclosed herein. FIGS. 2A through 2C show section views of the compression engine 10 through section line 2,4. FIGS. 2A through 2C depict the piston assembly 200 at three different positions within the cylinder 16: bottom dead center (BDC), (FIG. 2A); halfway between BDC and top dead center (TDC), (FIG. 2B); and TDC (FIG. 2C). FIGS. 3A through 3C are section views of the engine 10 through section line 3 showing the piston assembly 200 in the same positions that are depicted in FIGS. 2A through 2C. It is noted that some parts of a compression engine are omitted or simplified in the figures for clarity. For example, the compression engine 10 includes a fuel control system, not shown, for dispensing fuel into a top portion of a cylinder 16, for example at or near the top surface 17 of the cylinder.

Compression engine 10 includes a lower housing 14 which supports a crankshaft 110 that is rotatably supported within the lower housing.

The compression engine 10 includes an upper housing or cylinder block 12 that includes four cylinders 16A through 16C. The number of cylinders in exemplary compression engines according to the disclosed technology could include less than four cylinders, for example 1 or 2

Each piston assembly 200 includes a main piston 210 that is disposed within a cylinder 16. Each main piston 210 includes an inner piston cavity 255 in which an inner piston 310 is disposed. An outer diameter of the inner piston 310 is substantially smaller than an outer diameter of the main piston 210.

The main piston 210 travels along a longitudinal axis 19 of the cylinder 16 and the inner piston travels within the inner piston cavity along the same axis. The inner piston is configured and disposed to travel relative to the main piston 210 within the cylinder 16 such that a position of the inner piston along the longitudinal axis 19 of the cylinder may be different from a position of the main piston along the same axis during operation of the compression engine.

Each piston assembly 200 includes main piston connecting rods 216, 218 which are attached to both the main piston 210 and the crankshaft 110, thereby directly or indirectly connecting the main piston to the crankshaft. Each piston assembly includes an inner piston connecting rod 316A, connected to both the inner piston 310 and the crankshaft 110, thereby connecting the inner piston to the crankshaft. As shown, for example, in FIGS. 3*a* and 10*a*-10*b*, the main piston 210 is connected to main piston connecting rods 216, 218 with round pins 219 which enable rotation of the main piston connecting rods relative to the main piston. The inner piston 310 is connected to the inner piston connecting rod 316 by a round pin 319, which enables rotation of the inner piston connecting rod relative to the inner piston.

Figure 10A:
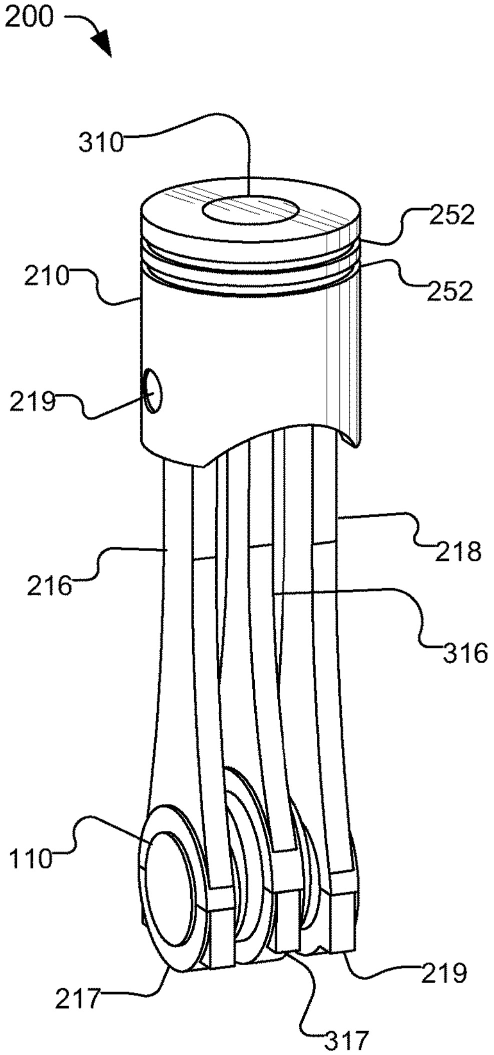
FIGS. 10A and 10B are perspective and exploded perspective views of a main cylinder that includes a groove for receiving seals.
Figure 10B:
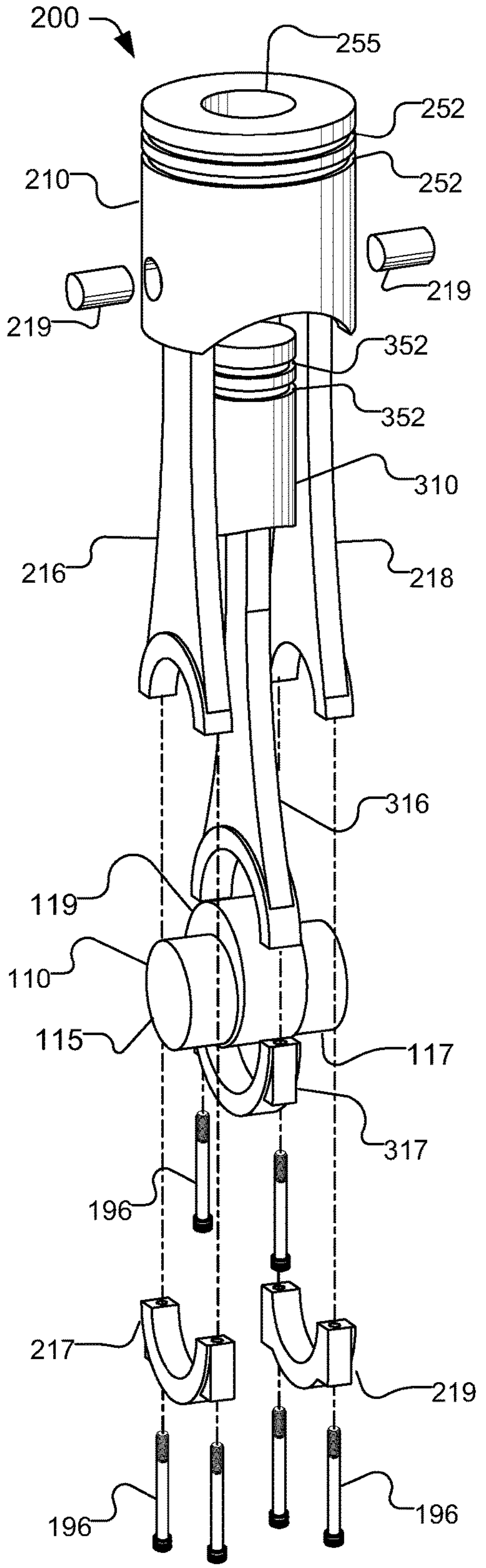

Referring to FIGS. 2A-3C and 10A-10B, in embodiments, the main piston connecting rods 216, 218 are connected to one of more main piston journals 115, 117 of the crankshaft 110 and each inner piston connecting rod 316 is connected to an inner piston journal 119 of the crankshaft. As shown in FIGS. 10A and 10B, in some embodiments the connecting rods 216, 218, and 316 are formed with a separate bottom portion, for example main cylinder connecting rod bottom portions 217 and 219 and inner cylinder connecting rod bottom portion 317. The connecting rods may be attached to the crankshaft 110 by assembling the connecting rods onto corresponding journals of the crank shaft 110 and attaching the connecting rod bottom portions to corresponding connecting rods, for example using threaded fasteners 196. The connections between the connecting rods 216, 218, 318 and the connecting rod journals 115, 117, 119 enables the connecting rods to rotate relative to the crankshaft 110. When the crankshaft 110 rotates relative to the lower housing 14, the interfaces between the connecting rods 216, 218, 316, journals, and pistons 210, 310 allow for linear motion of the pistons within the cylinders.

In operation, the inner piston's path through the cylinder is offset by a predetermined amount with respect to the main piston's path through the cylinder such that at the point when the main piston is just past the zenith, i.e., TDC, the top surface 312 or head of the inner piston becomes flush with the top surface 212 of head of the main piston (see FIGS. 2C and 3C). This motion of the inner piston ensures that fuel will detonate when the main piston is just past TDC, avoiding damage from untimely detonations. The ratio of the area of the top of the main piston to the top of the inner piston determines the timing of the detonation (along with other controllable factors such as fuel type and amount).

Figure 6:
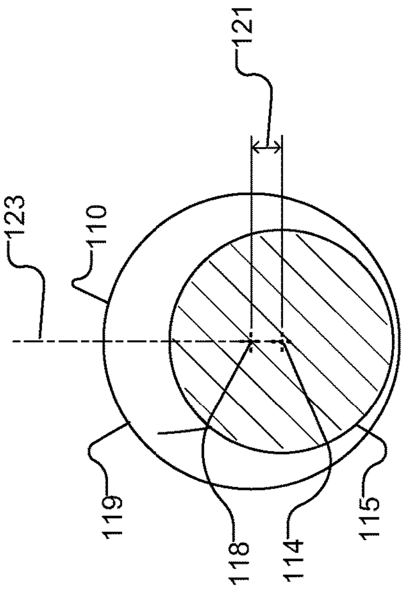
FIG. 6 is a side view showing the offset of the inner piston journal relative to an outer piston journal.
Figure 5:
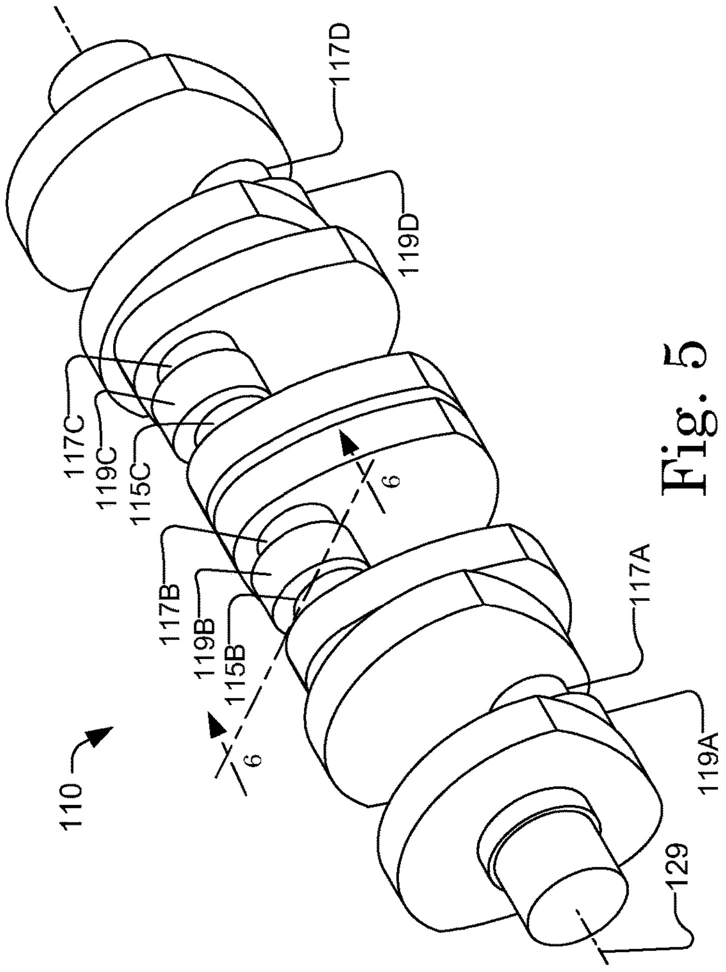
FIG. 5 is a perspective view of a crankshaft showing the offset connection of the connecting rod of the inner piston.
Figure 9:
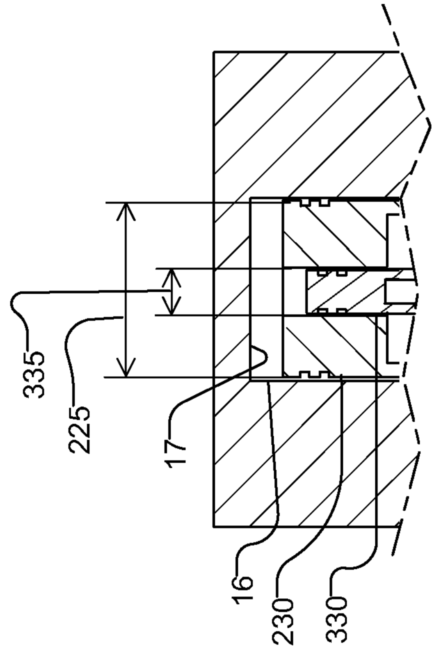
FIGS. 8 and 9 are cross section views of the pistons in a cylinder showing a diameter of the inner piston relative a diameter of the main piston varied such that a rate of reduction of volume of combustion gasses as the main cylinder approaches a top surface of the cylinder is varied.
Figure 8:
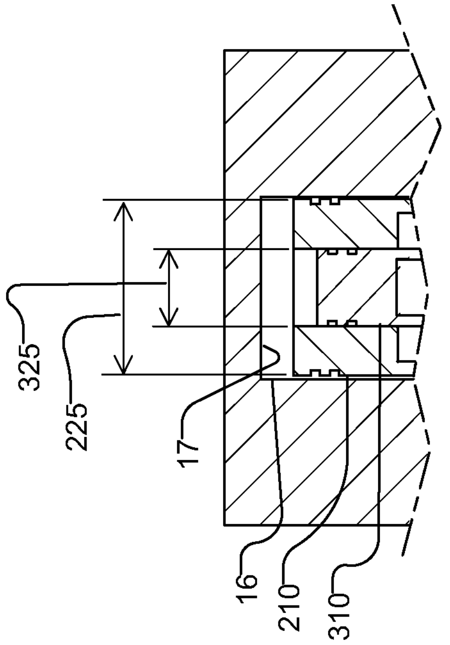

In an embodiment, the different piston paths are achieved via an offset inner piston journal 119 relative to the outer piston journals 115, 117 (FIGS. 5, 6, 10B). As shown in FIGS. 2A-2C, the inner piston connecting rod 316 is connected to the crankshaft 110 such that the inner piston's path through the cylinder is offset with respect to the main piston's path through the cylinder 16. During the upward stroke, the main piston will be higher than the inner piston (FIGS. 2A-2B and 3A-3B) until the main piston reaches the zenith or TDC of its motion (FIGS. 2C and 3C). At this point, a top surface 312 the inner piston 310 becomes flush with a top surface 212 the main piston 210, causing detonation and thereby ensuring the detonation occurs only when the main cylinder is at or just past top center of its motion As shown in FIG. 6, the offset of the inner piston journal 119 relative to an outer piston journal 115 may be represented as a distance 121 between a center point 118 of the outer piston journal 119 and a center point 114 of the inner piston journal 115 along a vertical line 123. It is noted that the line 123 is vertical relative to a longitudinal axis 129 of the crankshaft 110 when the crankshaft is in the full piston extension or TDC position shown in FIG. 5. A distance between the top surface 212 of the main piston 210 and the top surface 312 of the inner piston 310 during travel of the main piston relative to the cylinder 16 corresponds to the offset distance 121. The relative sizes of the inner piston and main piston may be varied to achieve different pressure change profiles. For example, as shown in FIGS. 8 and 9, a diameter 325, 335 of the inner piston 310 relative a diameter 225 of the main piston 210 may be varied such that a rate of reduction of volume of combustion gasses as the main cylinder 210 approaches a top surface 17 of a cylinder is varied.

Referring to FIGS. 10*a* and 10*b*, the main piston 210 may include one or more grooves or receptacles 252 (e.g., piston ring grooves) for receiving seals (e.g., piston rings), for example pliable piston seals, to form a seal between the main piston and inner walls of a cylinder and, in some embodiments, for wiping oil. In a like manner, the inner piston 310 may include receptacles 352 to receive seals for providing a seal and between the inner piston and the inner piston cavity 255.

Figures 4A, 4B, 4C:
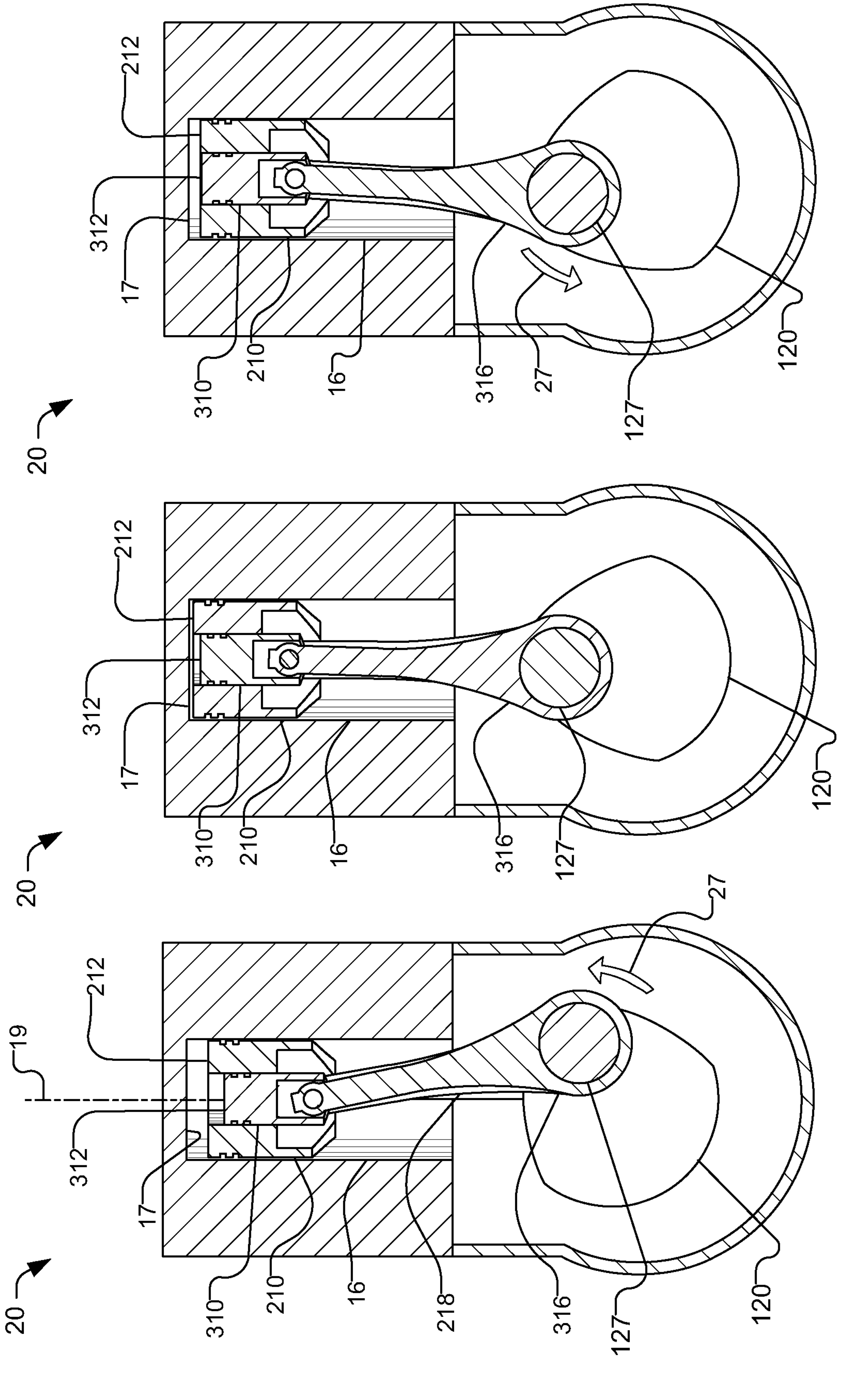
FIGS. 4A-4C are section views of a portion of an illustrative compression engine showing another embodiment having an offset of an inner piston journal.

In another embodiment, in which the main piston and inner piston are designed to become flush at the top surfaces past top dead center, as shown in FIGS. 4A-4C and 7, an offset of an inner piston journal 129 relative to a large piston journal 125 may be altered such that the top surface 312 of the inner piston 310 does not become flush with the top surface 212 of the main piston 210 until the main piston has traveled past top dead center. In this embodiment, the top surface if the inner piston is offset from the top surface of the main piston at top dead center, as shown in FIG. 4B. The top surface of the inner piston becomes flush with the top surface of the main piston at, for example, approximately 8 to 10 degrees of crankshaft rotation past top dead center, as shown in FIG. 4C. This arrangement may be advantageous for ensuring that peak pressure and detonation does not occur until just past top dead center.

Figure 7:
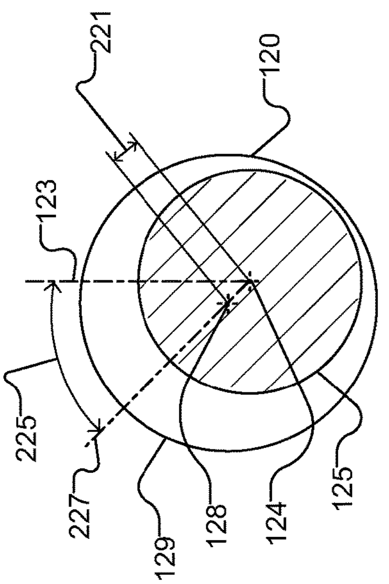
FIG. 7 is a side view showing a center point of an inner cylinder journal offset along a line relative to a center point of an outer connecting rod journal.

As shown in FIG. 7, a center point 129 of an inner cylinder journal 125 is offset along a line 227 relative to a center point 124 of an outer connecting rod journal 125. Line 227 is disposed at an angle 225 relative to the vertical line 123. This arrangement tends to shift the rotational position of crankshaft at which the top surface 312 of the inner cylinder 310 becomes flush with the top surface 212 of the main cylinder to after top dead center, as shown in FIG. 4*c*

Figure 11A:
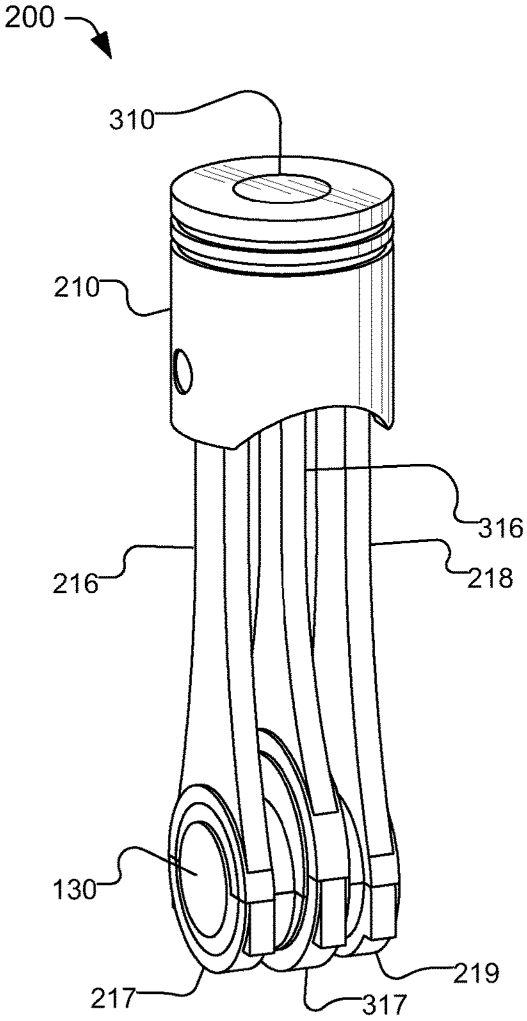
FIGS. 11A and 11B are perspective and exploded perspective views of a main cylinder with a crankshaft that includes a standard crankshaft with a crankshaft cam overlay on the main connecting rod added to form a short piston journal that is offset from long piston journals.
Figure 11B:
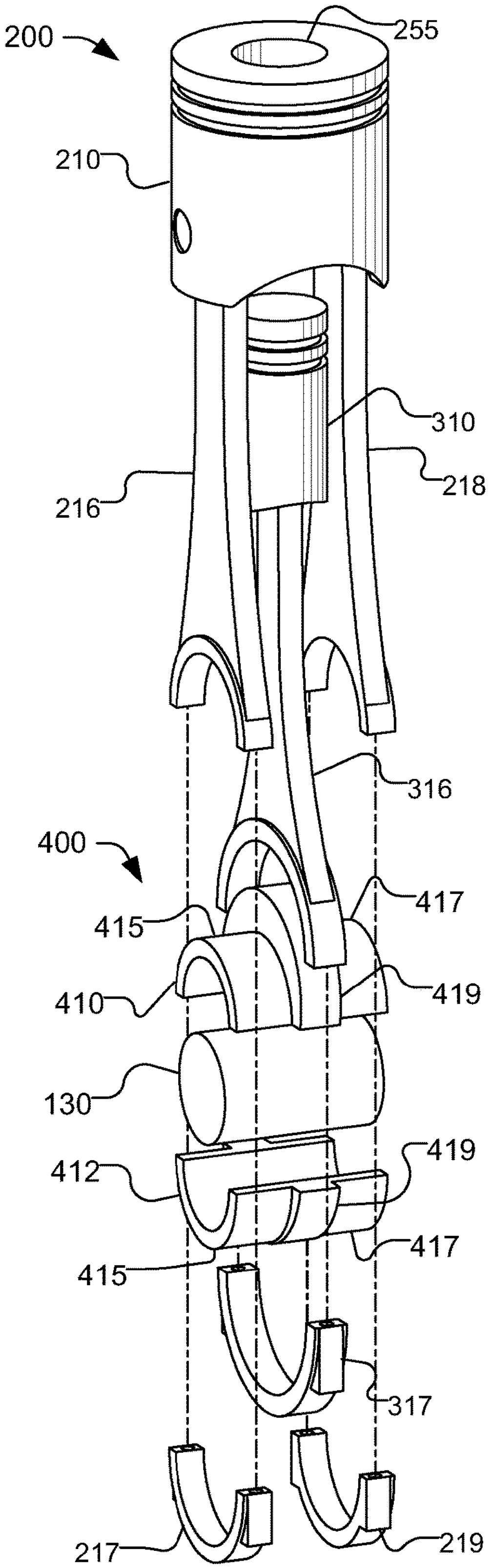

In the embodiments shown in FIGS. 1 through 10B, a crankshaft 110 may be modified or formed to include a center piston journal 119 or 129 that is offset from a main piston journal 115 or 125. Referring to FIGS. 11A and 11B, in an alternative embodiment, a crankshaft 130 may include a standard, unmodified, crankshaft with a crankshaft overlay 400 added to form a short piston journal on the main connecting rod 419 that is offset from long piston journals 415 and 117. A crankshaft overlay top 410 and a crankshaft overlay bottom 412 may be attached to the unmodified crankshaft 130, for example by welding, brazing, machining, or via one or more threaded fasteners, or by any other suitable means. This arrangement is advantageous in that a standard crankshaft may be used with piston assemblies 100 according to the inventive technology, which may reduce manufacturing costs and time.

Figure 12A:
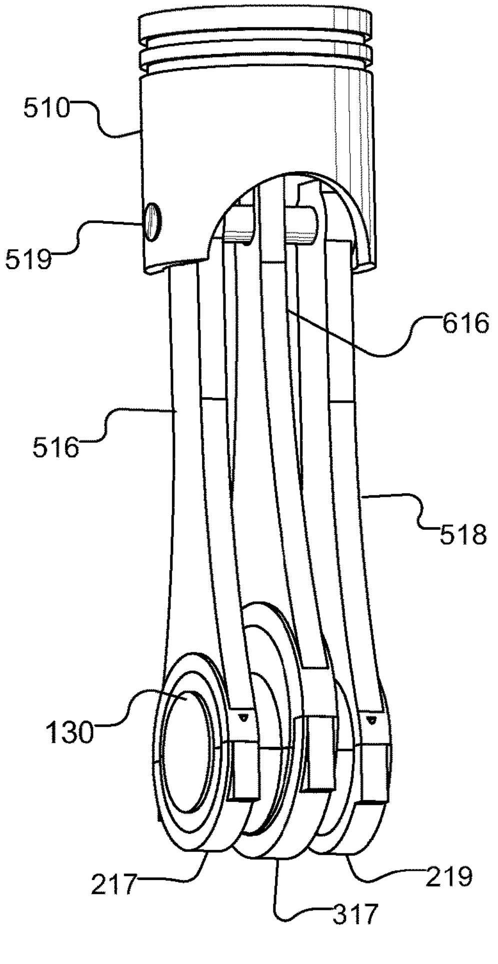
FIGS. 12A and 12B are perspective and exploded perspective views of an embodiment in which the connecting rod of the inner piston includes an opening to accommodate a wrist pin of the outer piston.
Figure 12B:
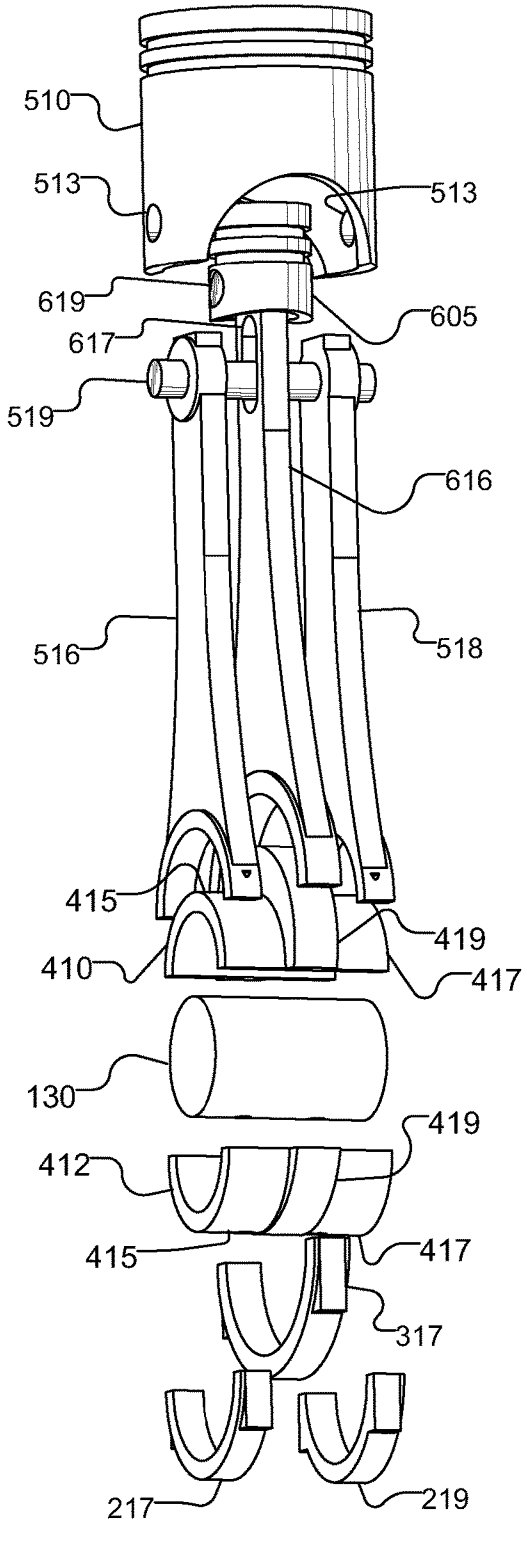
Figure 13A:
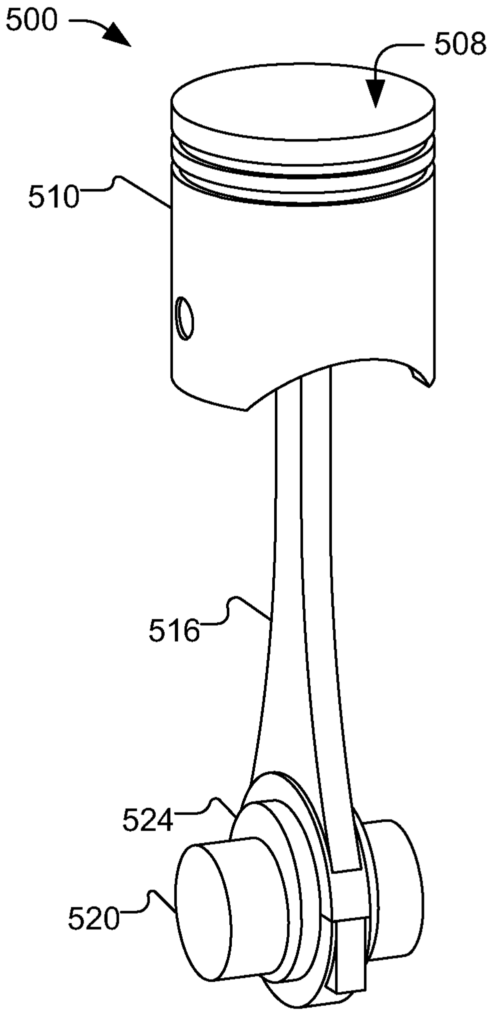
FIG. 13A is a perspective view of a crankshaft, cam, piston rod, and piston in accordance with another embodiment of the present disclosure.
Figure 13B:
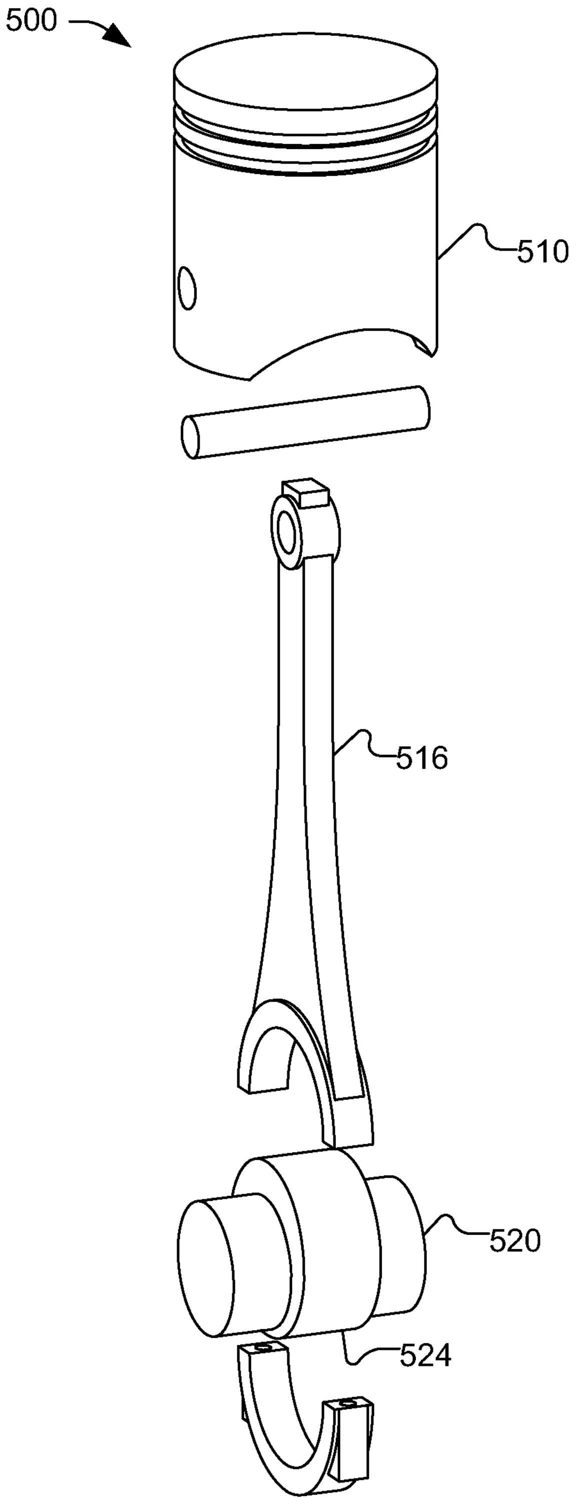
FIG. 13B is a partially exploded view of the components shown in FIG. 13A.
Figure 14A:
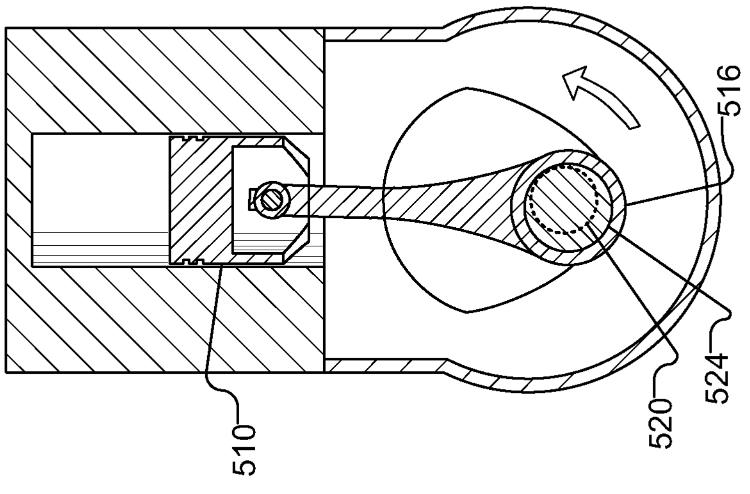
FIGS. 14A-14C are section views of a portion of an illustrative compression engine showing component positions at different points in the stroke cycle.
Figure 14B:
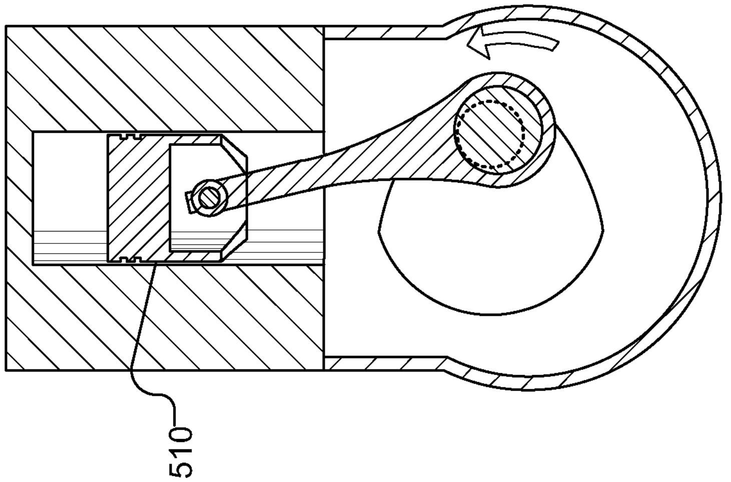
Figure 14C:
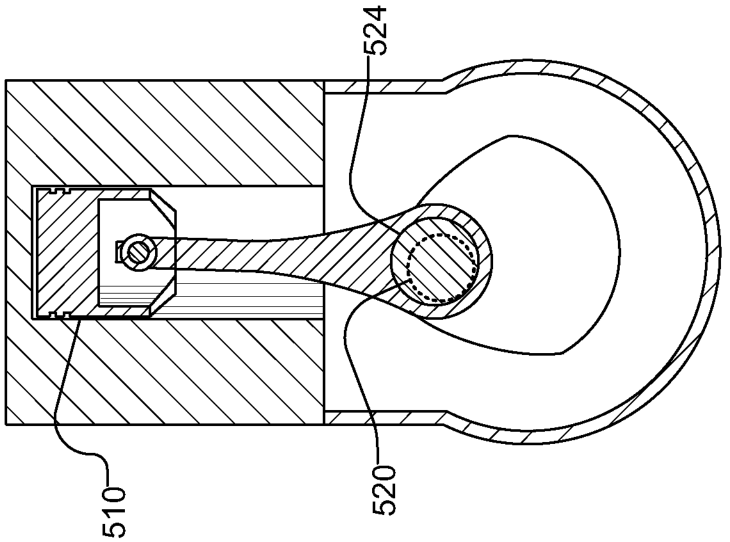
Figure 15:
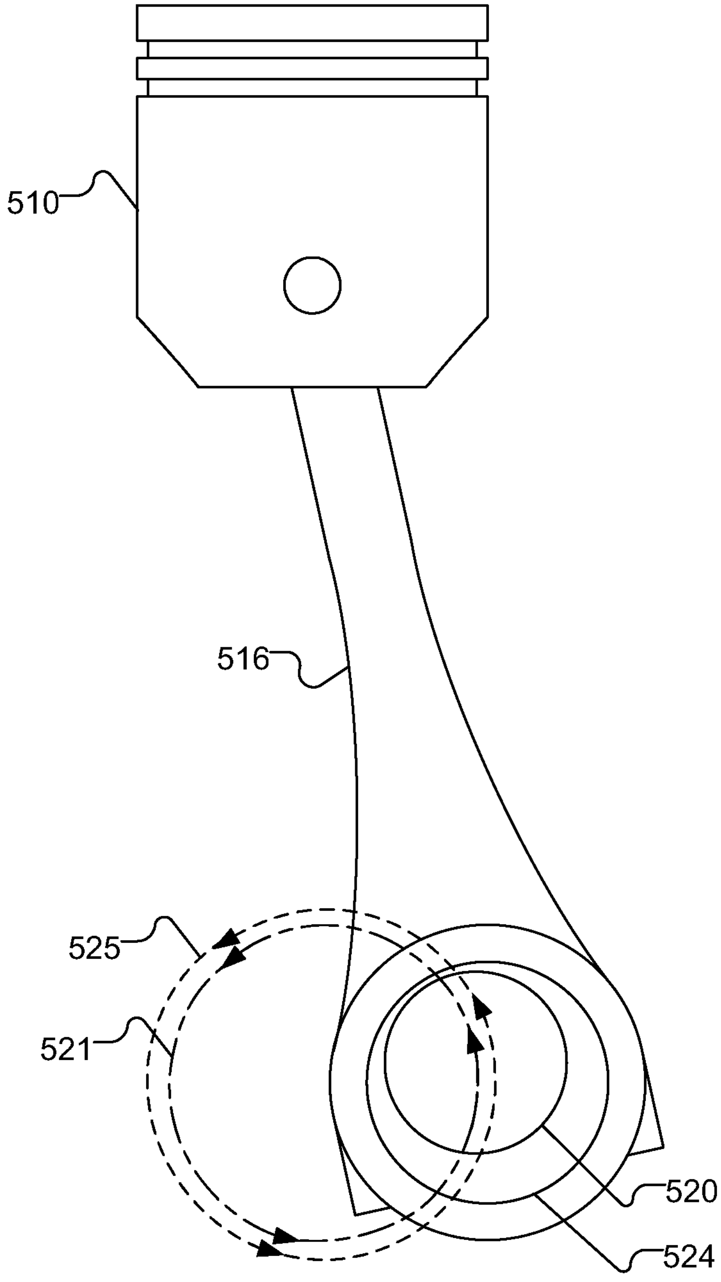
FIG. 15 is a side view of the components shown in FIG. 13A with the travel of the cam and crankshaft illustrated.

Referring to FIGS. 12A and 12B, in an alternative embodiment, an outer piston 510 includes a wrist pin hole 513 for wrist pin 519 for connecting piston 510 to connection rods 516, 518. A single wrist pin may be used for both connecting rods because inner piston connecting rod 616 of inner piston 605 includes an aperture 617 sized and positioned to accommodate wrist pin 519 during cycles. Inner piston connecting rod 516 may be connected to inner piston 605 via wrist pin 619 above aperture 617.

Pressure within a known compression engine may reach a peak value and concurrent, or closely following, detonation of a fuel or fuel and air mixture within a cylinder prior to the piston reaching top dead center (TDC) of crankshaft movement. Advantageously, pressure within a cylinder that houses a piston assembly according to a first exemplary embodiment, for example as depicted in FIGS. 2A-2C, reaches a peak pressure and detonation at or slightly after TDC. Pressure within a cylinder that houses a piston assembly according to a second exemplary embodiment, for example as should in FIGS. 4A-4C, reaches a peak pressure and detonation slightly after TDC, for example 5 to 10 degrees of crankshaft movement past TDC.

This may be advantageous at least in that pressure applied to the piston assembly, i.e., pressure from combustion impacts the top surface 212 of the main piston 210 and top surface 312 of the inner piston 310 during downward motion of the piston assembly 200. In this manner, the pressure is converted into downward linear motion of the piston rather than being absorbed by components of the piston assembly and crankshaft, as may occur when detonation occurs at, or prior to, the piston reaching TDC.

For compression engines having the above described piston systems, fuel detonation will depend on one or more of the following: the diameters of the inner and main piston, the position of the crankshaft, the angle of crankshaft offset, and the offset of the inner piston.

In another embodiment, as shown in FIGS. 13A-15, a piston subsystem 500 for a compression engine includes a piston 510 having a top surface 508. A connecting rod 516 connects the piston 510 to a crankshaft 520 via a cam 524 on crankshaft 520. The cam 524 on the crankshaft 520 provides an offset such that an orbit of the cam 524 during a stroke cycle is different than an orbit of the crankshaft 520 during the stroke cycle. The connecting rod 516 is connected to the cam 524 such that the orbit of the cam 524 is larger than the orbit of the crankshaft 520, as illustrated by dotted line 525 for the cam orbit and dotted line 521 for the crankshaft orbit included in FIG. 15. In this way, for each stroke cycle, the crankshaft 520 is always past the top of its orbit when the piston 510 is at top dead center, as illustrated in FIGS. 14A-14C (with direction of rotation indicated by block arrows). In this way, detonation always occurs on the downstroke of the cycle. The amount the crankshaft will be past TDC will vary based on design parameters and fuel mixture, and generally will be about 2 degrees to about 30 degrees past TDC.

The term "about" when used with a corresponding numeric value refers to ±20% of the numeric value, typically ±10% of the numeric value, often ±5% of the numeric value, and most often ±2% of the numeric value. In some embodiments, the term "about" can be taken as exactly indicating the actual numerical value.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A piston system for a compression engine comprising:
- a piston having a top surface;
- a connecting rod connecting the piston to a crankshaft; and
- a cam on the crankshaft, wherein the cam comprises a crankshaft overlay top and a crankshaft overlay bottom attached to the crankshaft to form a short piston journal that is offset from one or more long piston journals of the crankshaft and wherein the connecting rod is attached to the cam thereby providing an offset such that an orbit of the cam during a stroke cycle is larger than an orbit of the crankshaft and wherein the offset is configured so that the crankshaft is always past a top of the orbit of the crankshaft when the top surface of the piston reaches top dead center during each stroke cycle.

2. The piston system of claim 1, wherein the offset is configured so that the crankshaft is past the top of the orbit of the crankshaft by between about 2 degrees and 30 degrees when the top surface of the piston reaches top dead center during each stroke cycle.

3. A piston system for a compression engine comprising:
- a piston;
- a crankshaft;
- a cam on the crankshaft, wherein the cam comprises a crankshaft overlay top and a crankshaft overlay bottom attached to the crankshaft to form a short piston journal that is offset from one or more long piston journals of the crankshaft; and
- a connecting rod connected at a first end to the piston and at a second end to the cam,
- wherein the cam provides an offset such that through a stroke cycle an orbit of the cam is larger than an orbit of the crankshaft and wherein the offset is configured so that the crankshaft is always past a top of the orbit of the crankshaft when the piston reaches top dead center during each stroke cycle.

4. The piston system of claim 3, wherein the offset is configured so that the crankshaft is past the top of the orbit of the crankshaft by about 2 degrees to about 30 degrees when the piston reaches top dead center during each stroke cycle.

* * * * *